Nov. 14, 1961   D. MALDARI   3,008,434
MACARONI DIE
Filed Feb. 3, 1960
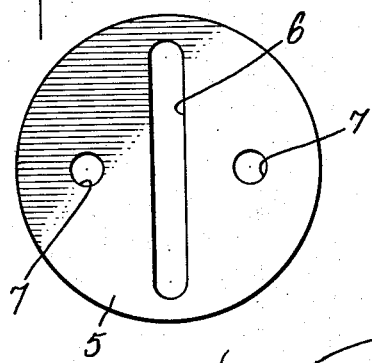
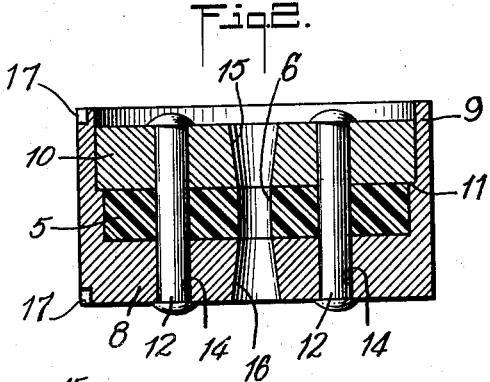
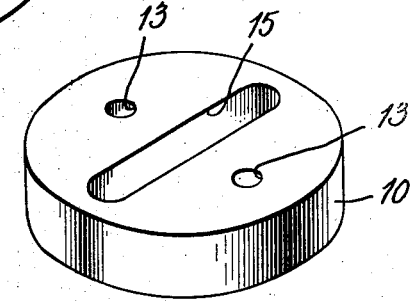
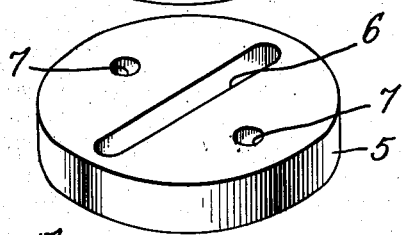
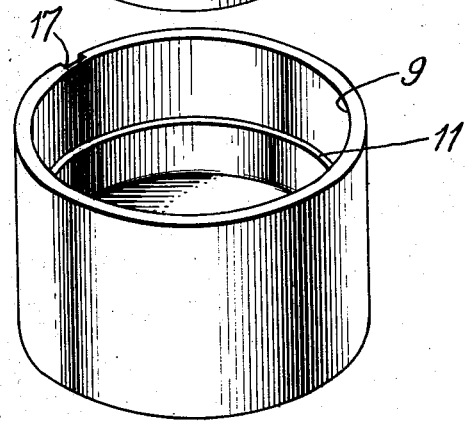
INVENTOR.
DONATO MALDARI
BY
ATTORNEY

United States Patent Office 3,008,434
Patented Nov. 14, 1961

3,008,434
MACARONI DIE
Donato Maldari, Brooklyn, N.Y., assignor to D. Maldari and Sons, Inc., Brooklyn, N.Y., a corporation of New York
Filed Feb. 3, 1960, Ser. No. 6,494
1 Claim. (Cl. 107—14)

The invention herein disclosed relates to the construction of dies for pressing macaroni, spaghetti, noodles, bread sticks, biscuit and bakery products, chocolate, candy and other extrudable materials in the food and drug industry and other related fields.

Objects of the invention are to provide a die of durable, simple, construction which will produce a superior product, at a faster rate and at less cost than has heretofore been possible.

Further objects of the invention are to provide a die which will stand up under long continued use and which will maintain its proper dimensions under such extended use.

Other desirable objects accomplished in this invention and the novel features of construction, combination and relation of parts through which such objects are attained are set forth and will appear in the course of the following specification.

The drawing accompanying and forming part of this specification is illustrative of a present preferred embodiment of the invention but structure may be modified and changed as regards this illustration, all within the true intent and scope of the invention as hereinafter defined and claimed.

FIG. 1 in the drawing is a plan view of the disk forming the die proper.

FIG. 2 is a cross sectional view of the complete die assembly.

FIG. 3 is a composite perspective view of the three main parts of the die.

The die forming elements is shown in FIG. 1 as a circular disk 5 having a single die slot or passage 6 therethrough and small holes 7 for the rivets or other fastenings which may be used for securing the die parts together and preventing this disk from being displaced by external forces.

A special feature of this die element is that it is a disk of the material commercially known as "Teflon" (polytetrafluoroethylene). This material because of its waxlike, indestructible nature and non-adhesive, low friction contact characteristics is particularly suited for use as a macaroni die, enabling rapid, smooth extrusion of the material. This die material in addition to promoting high production gives the extruded material a smooth, more polished surface, adding to the appearance of the final product.

The Teflon subjected to continuous extrusion pressure however has a tendency to change the outlet shape and size and a special feature of the present invention is that this latent fault is completely overcome by enclosing, confining and protecting the die member against distortion forces.

In the illustration this is accomplished by providing a cup-like holder having a bottom wall 8 and an upstanding side wall 9 proportioned to smoothly receive the disk as shown in FIG. 2 seated on the bottom wall and confined by the side wall.

Thus confined the somewhat compressible die disk is held against spreading, compression and distorting, or losing its shape and to maintain it thus it is protected against deforming pressure by an overlying rigid disk 10 fitted in the cup shaped holder and supported on an annular shoulder 11 on the side wall of the holder.

The parts are proportioned so that the pressure relieving plate 10 may barely contact the die disk thus to hold it firmly in place without applying any distorting or destructive pressure and to prevent the extruding material from forcing its way between the Teflon disk and other parts of the die.

The parts are secured in this relation in the present example by means of through rivets 12 passed through aligning openings 13 in the pressure accepting disk 10, the openings 7 in the die disk and openings 14 in the bottom wall of the holder.

The top plate has an opening or openings 15, funnel shaped in cross section in line with the die opening or openings 6 and the bottom wall has downwardly flared clearance opening or openings 16 in line with the die opening or openings, to avoid clogging of extruding material.

The combined die structure as shown in FIG. 2 is a compact, solid unit, free of dirt collecting crevices and thus easily kept in a clean, sanitary condition.

The die units disclosed may be of any size or shape and have single or any number of die outlets.

Teflon, because of its self-lubricating qualities, is particularly desirable as the die material but it is realized that other synthetic plastic materials may be used, such as polystyrene and polyethylene. Such materials while susceptible to distortion pressures are fully protected in the present invention and serve to provide a long lasting, high production die adapted to produce a polished product.

The slots 15 in the top, pressure plate and 16 in the bottom of the holder are cut on a downward and upward taper as indicated in FIG. 2 and to assure proper registry and alignment in assembling or working on the parts, notches or keyways 17 may be cut in the side of the holder both top and bottom. These keyways may be cut in the upper and lower edges of the holder after the die is completely assembled.

While the parts may ordinarily be secured together by through rivets as shown they may be secured by crimping the edge of the side wall in over the edge of the top plate.

The holder, which is usually of brass or bronze, may in some instances, as in the illustrated construction, be made to closely match or possibly slightly decrease the size of the die outlet or outlets in the Teflon disk, thus to make the outlet 16 form a gage determining the size of the extruded product and creating a stronger, more compact product than if it were extruded simply through the Teflon.

What is claimed is:

A macaroni die comprising a holding cup having a circular side wall and a rigid flat bottom wall, a flat disk of polytetrafluorethylene seated on said flat bottom wall and supported throughout its extent by said bottom wall, said disk shaped in close fitting engagement with said circular side wall and thereby confined about its edge by said side wall, said side wall having an annular shoulder in line with the upper face of said disk in its seated relation in the cup, a flat rigid top plate seated on said annular shoulder in flat engagement with the upper face of said disk, means securing said top plate and disk in nonrotative relation in said cup, said top plate, disk and bottom wall having aligned die passages therethrough, the die passage in the top plate being of downwardly tapering formation, the die passage in the disk being of substantially constant cross sectional dimensions and the die passage in the bottom wall being of downwardly flaring formation.

References Cited in the file of this patent

UNITED STATES PATENTS

| | | |
|---|---|---|
| 2,184,177 | Burrell | Dec. 19, 1939 |
| 2,245,608 | Rodgers | June 17, 1941 |
| 2,403,476 | Berry et al. | July 9, 1946 |

OTHER REFERENCES

"The Rubber Age & Synthetics" (Magazine), volume 34, June 1935, pp. 164, 165, 166.